(12) United States Patent
Mauro, II et al.

(10) Patent No.: US 8,312,262 B2
(45) Date of Patent: Nov. 13, 2012

(54) MANAGEMENT OF SIGNING PRIVILEGES FOR A CRYPTOGRAPHIC SIGNING SERVICE

(75) Inventors: Anthony P. Mauro, II, San Diego, CA (US); Oliver Michaelis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1055 days.

(21) Appl. No.: 10/837,161

(22) Filed: Apr. 30, 2004

(65) Prior Publication Data

US 2005/0246523 A1    Nov. 3, 2005

(51) Int. Cl.
*H06L 29/06* (2006.01)
(52) U.S. Cl. .......................... 713/156; 713/176
(58) Field of Classification Search .................. 713/156
See application file for complete search history.

(56) References Cited

U.S. PATENT DOCUMENTS

| | | | |
|---|---|---|---|
| 5,926,624 A * | 7/1999 | Katz et al. .................. 709/217 |
| 6,148,391 A * | 11/2000 | Petrick .......................... 712/202 |
| 6,223,291 B1 * | 4/2001 | Puhl et al. .................. 726/28 |
| 6,363,149 B1 * | 3/2002 | Candelore ...................... 380/45 |
| 6,412,400 B1 | 7/2002 | Gambino et al. | |
| 6,757,827 B1 * | 6/2004 | Geist ............................ 713/176 |
| 6,934,838 B1 * | 8/2005 | Boyce et al. .................. 713/156 |
| 7,210,037 B2 * | 4/2007 | Samar ........................... 713/176 |
| 7,631,188 B2 * | 12/2009 | Valente ......................... 713/175 |
| 7,725,723 B2 | 5/2010 | Landrock et al. | |

| | | | |
|---|---|---|---|
| 2002/0078355 A1 | 6/2002 | Samar ........................... 713/176 |
| 2005/0010758 A1 * | 1/2005 | Landrock et al. ............. 713/156 |
| 2006/0266245 A1 * | 11/2006 | Pera et al. ..................... 101/494 |

FOREIGN PATENT DOCUMENTS

| | | |
|---|---|---|
| EP | 0736484 A2 | 10/1996 |
| WO | 03015370 | 2/2003 |

OTHER PUBLICATIONS

Entrust, Securing Digital Identities & Information, "Entrust Certificate Services," More Than 10 SSL Certificates, copyright, 2003.*
Entrust, Securing Digital Identities & Information, "Entrust Certificate Services," Business Value, copyright, 2003.*
Entrust, Securing Digital Identities & Information, "Entrust Certificate Services," Verification Service, copyright, 2003.*

(Continued)

*Primary Examiner* — Kambiz Zand
*Assistant Examiner* — Dant Shaifer Harriman
(74) *Attorney, Agent, or Firm* — Kyong H. Macek; Won Tae Kim

(57) ABSTRACT

A Management System (MS) manages signing privileges for entities desiring cryptographic signatures, and a Certificate Authority (CA) provides a cryptographic signing service. MS registers entities for the cryptographic signing service, determines signing privileges for each entity, and processes requests from entities for signatures. For registration, MS obtains registration information for the entity and invokes CA to generate an identity certificate for the entity. This identity certificate contains cryptographic information used to uniquely identify the entity. For signature generation, MS receives a request for a signature from the entity, authenticates the entity, authorizes or denies the request based on the signing privileges stored for the entity, and invokes CA to generate the signature if the signature is authorized. CA provides the cryptographic signing service and generates signatures and certificates as directed by MS.

37 Claims, 10 Drawing Sheets

OTHER PUBLICATIONS

Entrust, Securing Digital Identities & Information, "Entrust Certificate Services," Identification Service, copyright, 2003.*
Entrust, Securing Digital Identities and Information, "Entrust Certificate Services," More Than 10 SSL Certificates, Copyright, 2003.*
Entrust, Securing Digital Identities and Information, "Entrust Certificates Services," Verification Service, copyright, 2003.*
Entrust, Securing Digital Identities and Information, "Entrust Certificate Services," Identification Service, copywright, 2003.*
Entrust, Securing Digital Identities and information, "Entrust Certificate Services," Business Value, Copyright, 2003.*
Entrust, Securing Digital Identities, "Entrust Certificate Services," Identification Service, Copyright, 2003.*
Entrust, Securing Digital Identities and Information, "Entrust Certificate Services," More Than 10 SSL Certificate, Copyright, 2003.*
Entrust, Securing Digital Identities and Information, "Entrust Certificate Services," Business Value, Copyright, 2003.*
Entrust, Securing Digital Identities and Information, "Entrust Certificate Services," Verification Service, Copyright, 2003.*
Entrust, Securing Digital Identities and Information, "Entrust Certificate Services," Identification Service, Copyright, 2003.*
International Search Report and Written Opinion—PCT/US2005/011758, International Search Authority—European Patent Office—Jun. 23, 2005.
Taiwan Search Report-TW094113965-TIPO-Jul. 29, 2011.

* cited by examiner

MANAGEMENT OF SIGNING PRIVILEGES FOR A CRYPTOGRAPHIC SIGNING SERVICE

BACKGROUND

I. Field

The present invention relates generally to cryptography, and more specifically to techniques for managing signing privileges for a cryptographic signing service.

II. Background

Cryptography is widely used to provide security for various applications. Cryptography may be used to safeguard confidential and critical information, provide authentication, support secure transactions, protect software and contents, and so on.

As an example, cryptography may be used to control which software releases may be executed by a wireless device (e.g., a cellular phone). The wireless device typically requires software to control the hardware within the device and to support various designed functions. The software may be loaded into a non-volatile memory within the device during manufacturing and/or downloaded onto the device during activation. Regardless of how the software is loaded onto the device, it may be desirable or necessary to (1) ascertain whether or not the loaded software is authorized, (2) allow execution of the software if it is an authorized version, and (3) prevent execution of the software if it is an unauthorized version.

To complicate matters, there may be many different models of wireless devices and many different software releases for each device model. Furthermore, there may be many vendors, and each vendor may have different privileges as to which software releases the vendor may use for each device model. It may thus be challenging to keep track of the privileges of the different vendors and to provide cryptographic services for these vendors in an efficient manner.

SUMMARY

Techniques for managing signing privileges for a cryptographic signing service are described herein. As used herein, signing privileges relate to "rights" under which an entity is authorized to obtain cryptographic signatures (or simply, "signatures") from the cryptographic signing service. These rights may be created by the terms of licensing agreements or some other means. The signing privileges (which may also be called "entitlements") may indicate items or combinations of items for which signatures may be obtained. These items are typically application dependent. For example, the items may be software releases, hardware platforms, and so on. The items may also be contents (e.g., games, music, video, and so on) suitable for download onto electronics devices. The cryptographic signing service is a service that generates a signature when requested by an entity and if the signature is authorized based on the signing privileges for the entity.

In an embodiment, a Management System (MS) manages signing privileges for entities (e.g., vendors) desiring cryptographic signatures, and a Certificate Authority (CA) provides the cryptographic signing service. The MS registers vendors with the CA for the cryptographic signing service, determines signing privileges for each registered vendor, and processes requests by the vendors for signatures. In order to register a vendor with the CA, the MS obtains registration information for the vendor (which may be provided by an MS administrator) and invokes the CA to generate an identity certificate for the vendor. This identity certificate contains cryptographic information that is used to uniquely identify the vendor. For signature generation, the MS receives a request for a signature from the vendor, authenticates the vendor, authorizes or denies the request based on the signing privileges stored at the MS for the vendor, and invokes the CA to generate the signature if the signature is authorized. The CA provides the cryptographic signing service and generates signatures and certificates as directed by the MS.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques for managing signing privileges for a cryptographic signing service, as described herein, may be used for various applications. For clarity, these techniques are specifically described for an exemplary application, which is the enforcement of authorized (e.g., licensed) use of specific software releases (or software versions) on specific hardware platforms.

For this exemplary application, a licensor entity may have rights to various hardware platforms, and each platform may be assigned a different hardware identifier (ID). The licensor entity may grant another entity (e.g., a vendor) licenses for some hardware platforms and no licenses for other hardware platforms. For each licensed hardware platform, the vendor may be granted a license to use certain software releases, where each software release may have different capabilities and functions. The vendor may further be restricted to certain (or no) debug capabilities for each licensed software release. Access to the internal circuitry of a given hardware platform may be needed in order to effectively debug the hardware platform. However, access to the internal circuitry also compromises the security of the hardware platform. The debug capabilities thus define the extent of access to internal circuitry allowed for the vendor.

Figure 1:
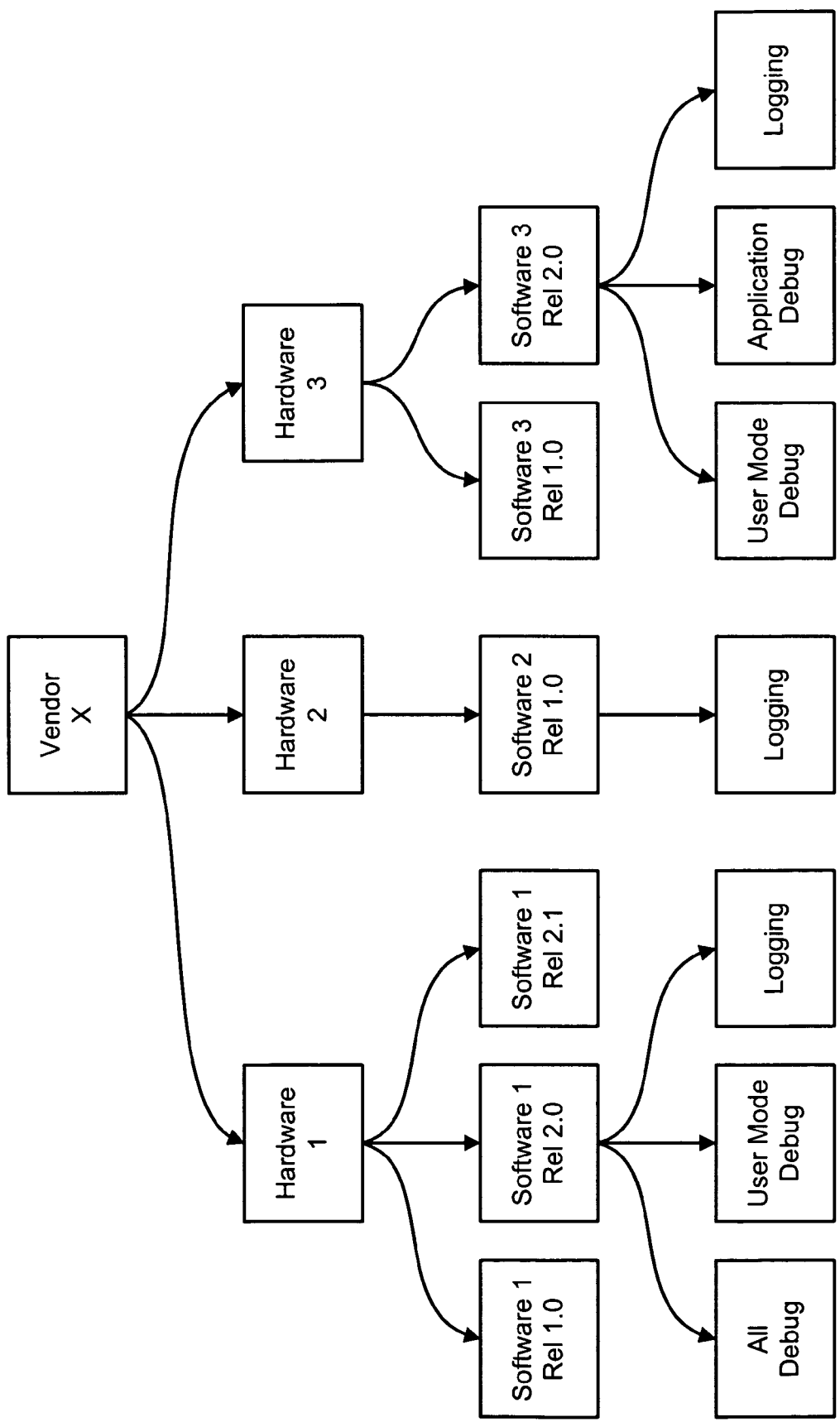
FIG. 1 shows an exemplary hierarchy of signing privileges for a vendor.

FIG. 1 shows an exemplary hierarchy of signing privileges for a vendor. In this example, the vendor has a license for three different hardware platforms, which are denoted as Hardware 1, Hardware 2, and Hardware 3. Each hardware platform may correspond to, for example, a different application specific integrated circuit (ASIC) used for a wireless device. For Hardware 1, the vendor is licensed for three different software releases, which are denoted as Software 1 Rel 1.0, Software 1 Rel 2.0, and Software 1 Rel 2.1. For Software 1 Rel 2.0, the vendor is authorized for all debug, user mode debug, and logging capabilities, which are different debugging capabilities for the software and/or hardware. For Hardware 2, the vendor is licensed for a single software release, which is denoted as Software 2 Rel 1.0, and is also authorized for just logging capability on this software release. For Hardware 3, the vendor is licensed for two different software releases, which are denoted as Software 3 Rel 1.0 and Software 3 Rel 2.0. For Software 3 Rel 2.0, the vendor is authorized for user mode debug, application debug, and logging capabilities. The vendor is not authorized for any debug capability on the other software releases. For this exemplary application, the signing privileges relate to specific combinations of hardware platforms, software releases, and debug capabilities authorized for the vendor.

Figure 2:
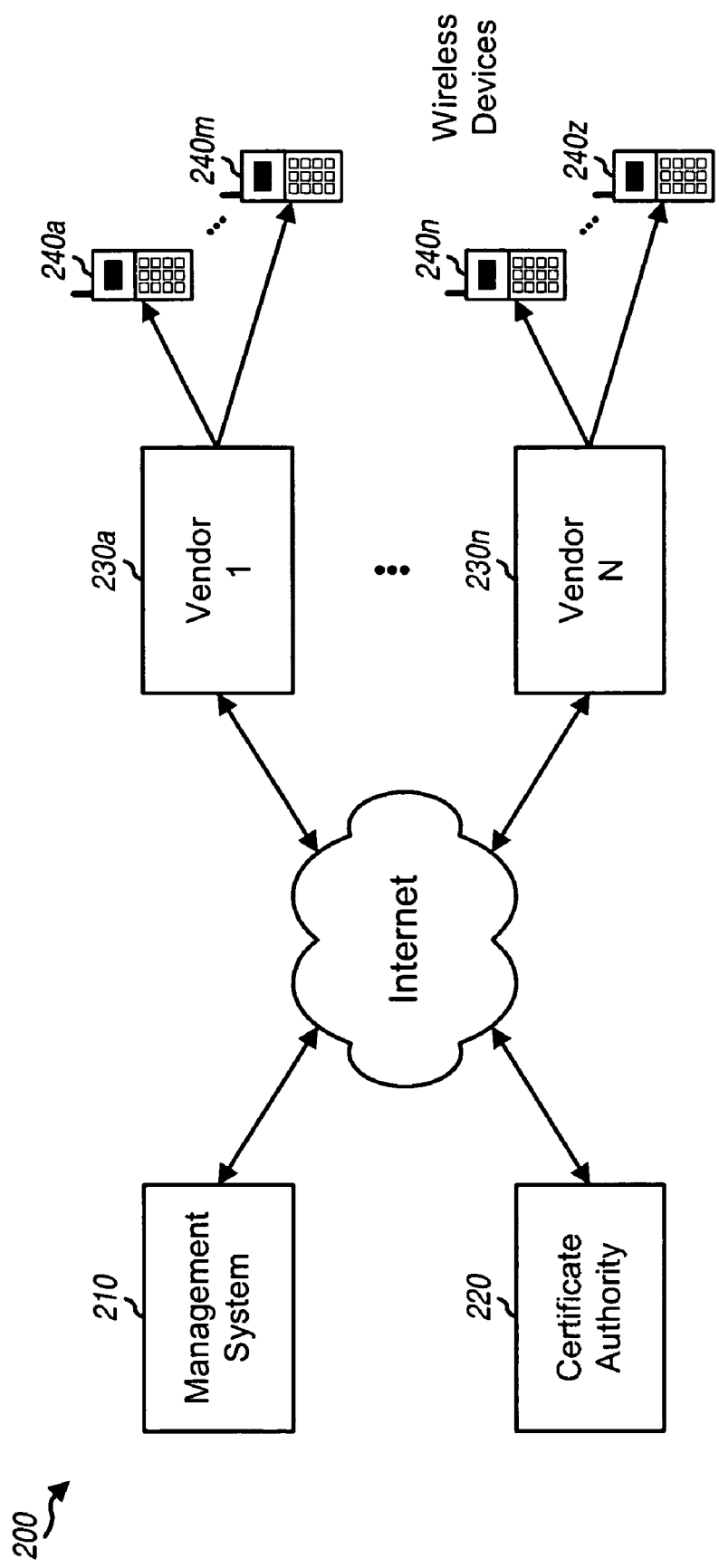
FIG. 2 shows an overall system for managing signing privileges and providing a cryptographic signing service.

FIG. 2 shows an overall system 200 for managing signing privileges and providing a cryptographic signing service. Vendors 230a through 230n may each be authorized to provide software for wireless devices 240a through 240z. The wireless devices 240 may utilize different hardware platforms and may be manufactured by vendors 230, which may be original equipment manufacturers (OEMs) or other entities. The software may be program codes that are used to operate the hardware platforms for the wireless devices. Each vendor 230 may have one or more licensing agreements with one or more licensing entities. These agreements authorize the vendor 230 to provide certain software releases for certain hardware platforms.

A Certificate Authority 220 performs cryptographic functions for system 200. Certificate Authority 220 provides the cryptographic signing service, generates and manages cryptographic keys, generates signatures and certificates, and so on. Certificate Authority 220 generates a unique secret identity for each vendor 230 that has registered with a Management System 210. Certificate Authority 220 also generates a signature whenever requested by a vendor 230, if the signature is authorized.

Management System 210 registers vendors 230 for the cryptographic signing service, determines signing privileges for each registered vendor 230, and processes requests for signatures from the vendors 230. Management System 210 also maintains a database of the registered vendors 230 and the signing privileges for each registered vendor 230. The vendors 230 and their signing privileges may be determined from licensing agreements for the vendors 230 or some other means. In the system 200 of FIG. 2, the Internet is shown as the medium between the vendors 230, the Management System 210 and the Certificate Authority 220. However, it should be noted that the embodiments described herein may be implemented in systems that use other mediums to communicatively couple the vendors 230, the Management System 210 and the Certificate Authority 220.

If a vendor 230 has a particular software release that the vendor 230 desires to download onto a wireless device 240 utilizing a particular hardware platform, the vendor 230 interacts with Management System 210 to request a signature for the software release. If the vendor 230 has the signing privilege for that combination of software release and hardware platform, then Management System 210 invokes Certificate Authority 220 to generate the requested signature. Certificate Authority 220 obtains pertinent signing information from the vendor 230 and Management System 210, generates the signature for the software release and hardware platform, and sends the signature and a code certificate to the vendor 230. The code certificate contains cryptographic information used to authenticate the signature. The vendor 230 then forms a code image with the software release, the signature, and the certificate. The image may be downloaded onto a wireless device 240. Thereafter, the wireless device 240 validates the signature in the image based on the cryptographic information in the certificate and secure information within the device 240. The wireless device 240 only executes the software in the image if the signature is validated, which indicates that the device 240 is authorized to execute the software.

Figure 3:
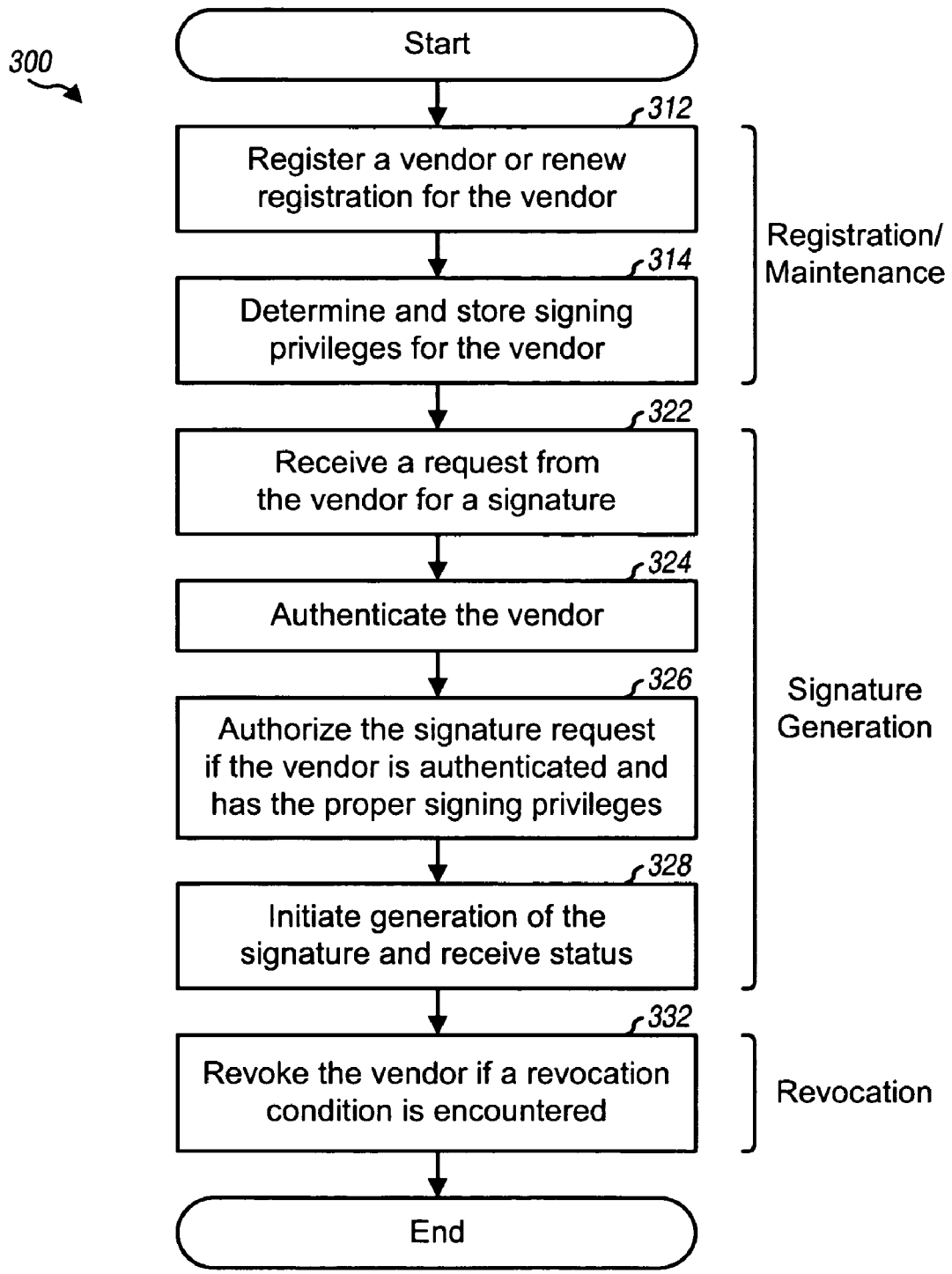
FIG. 3 shows a process performed by a Management System for the vendor.

FIG. 3 shows a flow diagram of an overall process 300 performed by Management System for one vendor. The vendor is first registered with the Management System, or the registration of the vendor is renewed 312. A valid registration with the Management System is needed in order to request and obtain signatures from the cryptographic signing service. Signing privileges for the vendor are determined (e.g., based on the vendor's licensing agreements) and stored in the database maintained by the Management System 314. For example, the signing privileges may relate to specific software releases that the vendor is authorized for each hardware platform, the debug capabilities for each software release, and so on. Block 314 may be performed whenever there is a change in the signing privileges of the vendor.

Thereafter, the Management System receives from the vendor a request for a signature for a particular software release and a particular hardware platform 322. The Management System authenticates the vendor to ensure that the vendor's identity is as claimed 324. The Management System authorizes the vendor's request for a signature if the vendor is authenticated, has a valid registration, and has signing privilege for the software release and hardware platform 326. If the request is authorized, then the Management System initiates generation of the signature (e.g., via communication with the Certificate Authority) and thereafter receives a status indicator of the signature generation 328. Blocks 322 through 328 are performed each time the vendor requests a signature.

The Management System may revoke the signing privileges of a vendor for various reasons 332. For example, the signing privileges of a vendor may be revoked if registration is not renewed within a designated time period, if secure information for the vendor is compromised, if the vendor is not in compliance with its licensing agreements, and so on. If the signing privileges of a vendor are revoked, then the Management System denies all subsequent requests from the vendor for signatures. Other actions may also be taken for a revoked vendor to safeguard the integrity of the overall system.

Figure 4:
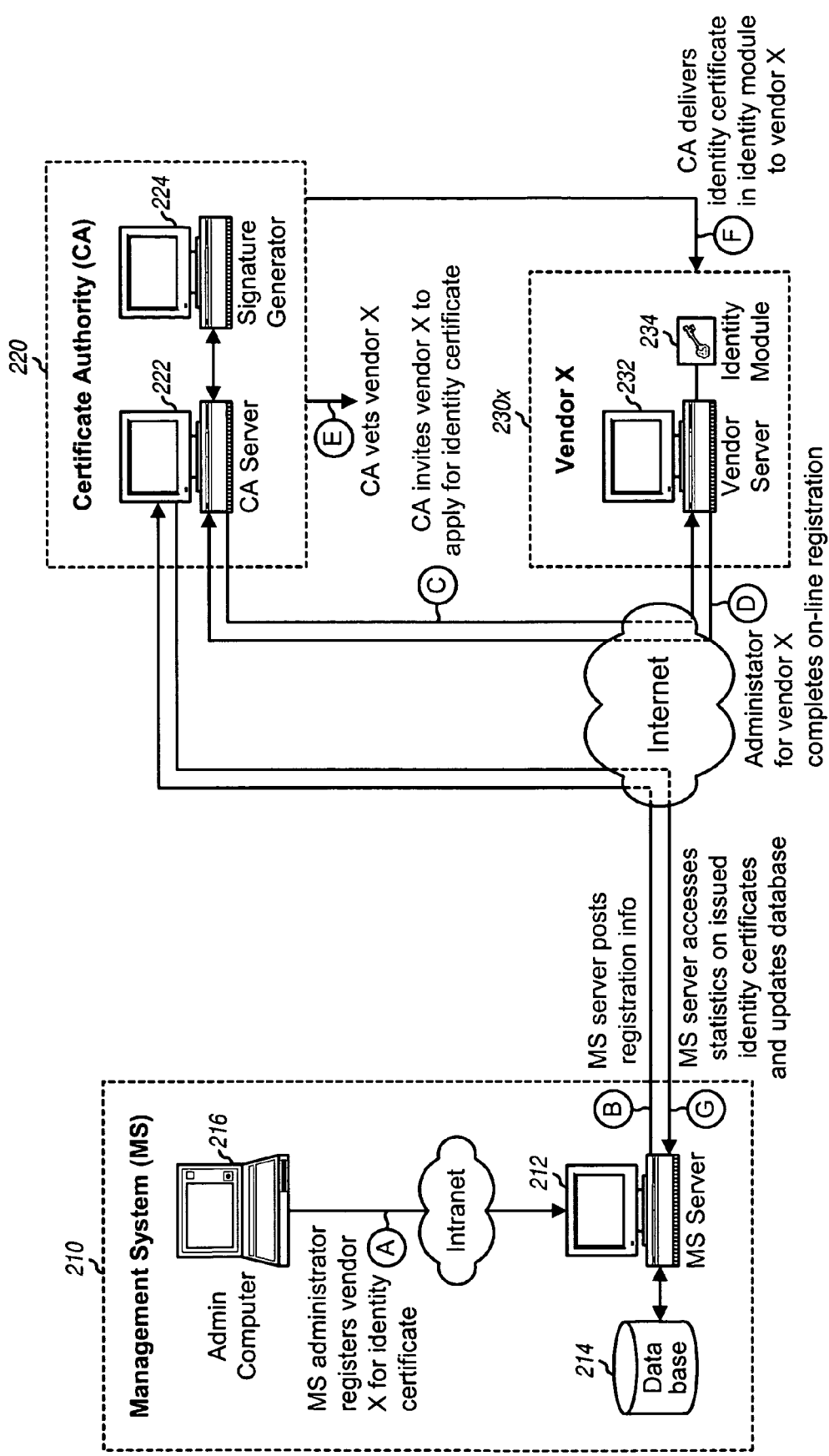
FIG. 4 shows the Management System, the Certificate Authority, and the vendor.

FIG. 4 shows a block diagram of an embodiment of Management System 210, Certificate Authority 220, and one vendor 230x in system 200. For this embodiment, Management System (MS) 210 includes an MS server 212, a secure storage unit 214 holding a database, and an administrator (admin) computer 216. MS server 212 manages registration and renewal of vendors, maintains the database of the registered vendors and their signing privileges, and processes requests for signature. MS server 212 communicates with Certificate Authority 220 and vendor 230x for registration and signature generation. Storage unit 214 stores the database for vendors and their signing privileges. An MS administrator may use admin computer 216 to access MS server 212 in order to register and update vendors and their signing privileges. Admin computer 216 may communicate with MS server 212 via an intranet (as shown in FIG. 4) or a direct connection. Admin computer 216 may also be a part of MS server 212.

Certificate Authority (CA) 220 includes a CA server 222 and a signature generator 224. CA server 222 communicates with Management System 210 and vendor 230x for registration and signature generation. Signature generator 224 manages cryptographic keys and generates signatures and certificates. If directed by CA server 222, signature generator 224 generates an identity certificate for a vendor as part of the registration process and also generates a signature for a vendor as part of a signature generation process. The identity certificate contains cryptographic information used to uniquely identify the vendor. In an embodiment, this cryptographic information is in the form of a private key for the vendor, which is referred to herein as the "vendor private key." The identity certificate and signature may be generated using (1) information received from the vendor and the Management System 210 and (2) secure information stored by the signature generator 224, as described below.

Vendor 230x includes a vendor server 232 and an identity module 234. Vendor server 232 communicates with Management System 210 and Certificate Authority 220 for registration and signature generation. Identity module 234 is cryptographically secure and holds the identity certificate for vendor 230x. Identity module 234 may be implemented, for example, as a hardware token (or a cryptographic token) that couples to vendor server 232 via an input/output (I/O) port. The combination of vendor server 232 and identity module 234 may also be referred to as a "signing tool".

FIG. 4 shows an embodiment of three entities in system 200. However, each of these entities may be implemented in various manners, which may be different from that shown in FIG. 4. For example, Certificate Authority 220 may be part of Management System 210. In this case, CA server 222 may couple to MS server 212 via a direct connection, or MS server 212 may communicate directly with signature generator 224.

Figure 5:
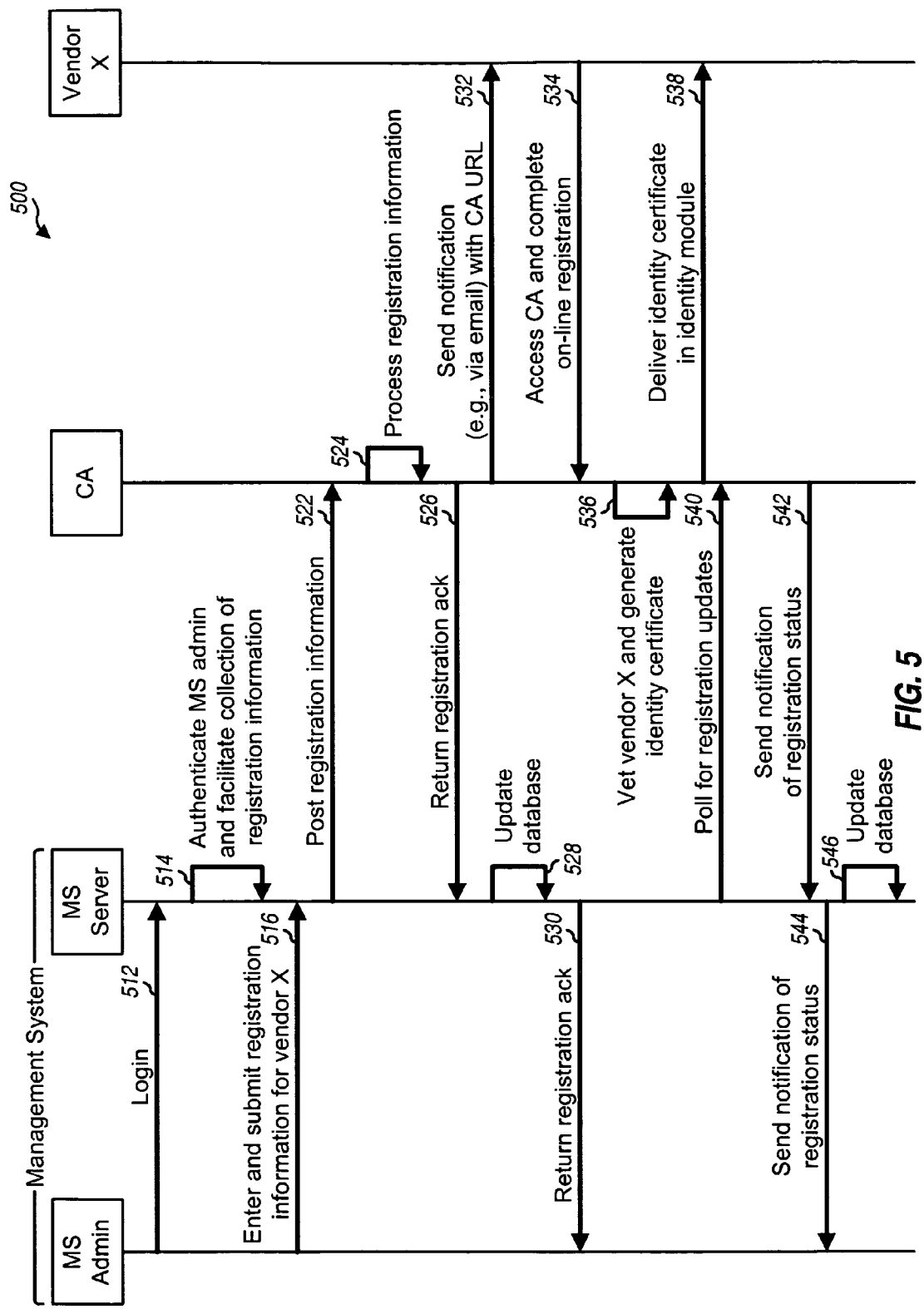
FIG. 5 shows a registration process.

FIG. 5 shows a signal flow diagram of a registration process 500 for registering vendor 230x with Management System 210. For clarity, the registration process is described in conjunction with the block diagram in FIG. 4.

An MS administrator having the proper authority initiates the registration process. The MS administrator uses admin system 216 to access Management System 210 via a secure link (step 512). A secure link may be obtained with a Secure Sockets Layer (SSL) session or by some other means. Management System 210 authenticates the MS administrator identity and, if authenticated, facilitates the collection of registration information for vendor 230x (step 514). In an embodiment, Management System 210 provides all of the options available for registration and allows the MS administrator to select from among the available registration options. Such options may be the vendor company name, contact mailing and email addresses, and so on. The MS administrator would then select the appropriate registration options for vendor 230x from among the available options. In another embodiment, Management System 210 provides the appropriate dialog boxes, and the MS administrator enters the registration information via these dialog boxes. In any case, the MS administrator enters registration information for vendor 230x and submits the information to Management System 210 (step 516). Steps 512, 514, and 516 correspond to step A in FIG. 4.

Upon receiving the registration information, Management System 210 posts (i.e., submits or sends) some or all of the registration information to Certificate Authority 220 over a secure link (step 522, which corresponds to step B in FIG. 4). Certificate Authority 220 receives the posted registration information, performs authentication of Management System 210, and uses the posted registration information to contact vendor 230x regarding the identity module and to perform vetting of vendor 230x (step 524). Certificate Authority 220 also returns a registration acknowledgment (ack) to Management System 210 (step 526). Management System 210 then updates the database to indicate that an identity certificate is being established for vendor 230x (step 528) and also forwards the acknowledgment to the MS administrator (step 530).

After processing the registration information, Certificate Authority 220 sends to vendor 230x a notification of the registration process and an invitation for the vendor to complete the registration process with the Certificate Authority (step 532, which corresponds to step C in FIG. 4). The notification and invitation may be sent along with a Uniform Resource Locator (URL) for the Certificate Authority, e.g., via an email or some other means. Vendor 230x then accesses Certificate Authority 220 via a secure link using the provided URL, completes on-line registration, and provides pertinent information used to vet (i.e., examine and approve) the vendor (step 534, which corresponds to step D in FIG. 4). Certificate Authority 220 then vets vendor 230x based on the information collected from the vendor and the Management System (step 536, which corresponds to step E in FIG. 4). The vetting may be performed by parsing the posted registration information from Management System 210 and verifying the parsed data against various legal business documents. For example, a vendor may request a Dun and Bradstreet report (D&B report). Once the identity of the vendor has been established as a valid entity, with no outstanding legal issues on record, the vendor is "vetted". Once vendor 230x has been vetted, Certificate Authority 220 generates an identity certificate for the vendor (also in step 536) and delivers an identity module with the identity certificate to the vendor (step 538, which corresponds to step F in FIG. 4).

Management System 210 may poll Certificate Authority 220 (e.g., periodically or when triggered) to obtain updates on the registration status of vendor 230x (step 540). In response to the poll and after generation of the identity certificate, Certificate Authority 220 sends a notification of the registration status to Management System 210 (step 542, which corresponds to step G in FIG. 4). This notification may include, for example, a public certificate used to validate any signed data generated with the identity certificate, the time/date of the vendor notification in step 532, the time/date of the vendor access in step 534, the time/date of the vetting and identity certificate generation in step 536, the time/date of the identity certificate delivery in step 538, and so on. Management System 210 forwards the notification of registration status to the MS administrator (step 544) and also updates its database accordingly with the information in the notification from Certificate Authority 220 (step 546).

Management System 210 maintains the database of the signing privileges for each registered vendor. The MS administrator may set and update the signing privileges for each vendor via the Management System.

Figure 6:
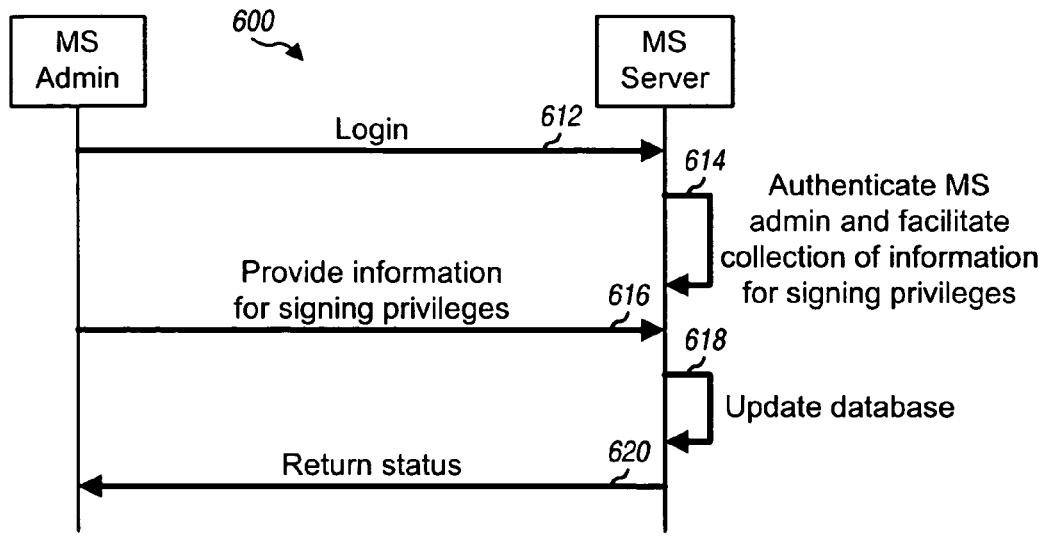
FIG. 6 shows a process to update the signing privileges for the vendor.

FIG. 6 shows a signal flow diagram of a process 600 to update the signing privileges for vendor 230x. The MS administrator accesses Management System 210 via a secure link (step 612). Management System 210 authenticates the MS administrator identity and, if authenticated, facilitates the collection of information for the signing privileges for vendor 230x (step 614). In an embodiment, Management System 210 provides all of the signing privilege options available for vendor 230x and allows the MS administrator to select from among the available options. In another embodiment, Management System 210 provides the appropriate dialog boxes, and the MS administrator enters the signing privilege information via these dialog boxes. In any case, the MS administrator provides signing privilege information for vendor 230x and submits the information to Management System 210 (step 616). Management System 210 then updates its database with the signing privilege information (step 618) and returns a status to the MS administrator (step 620).

Figure 7:
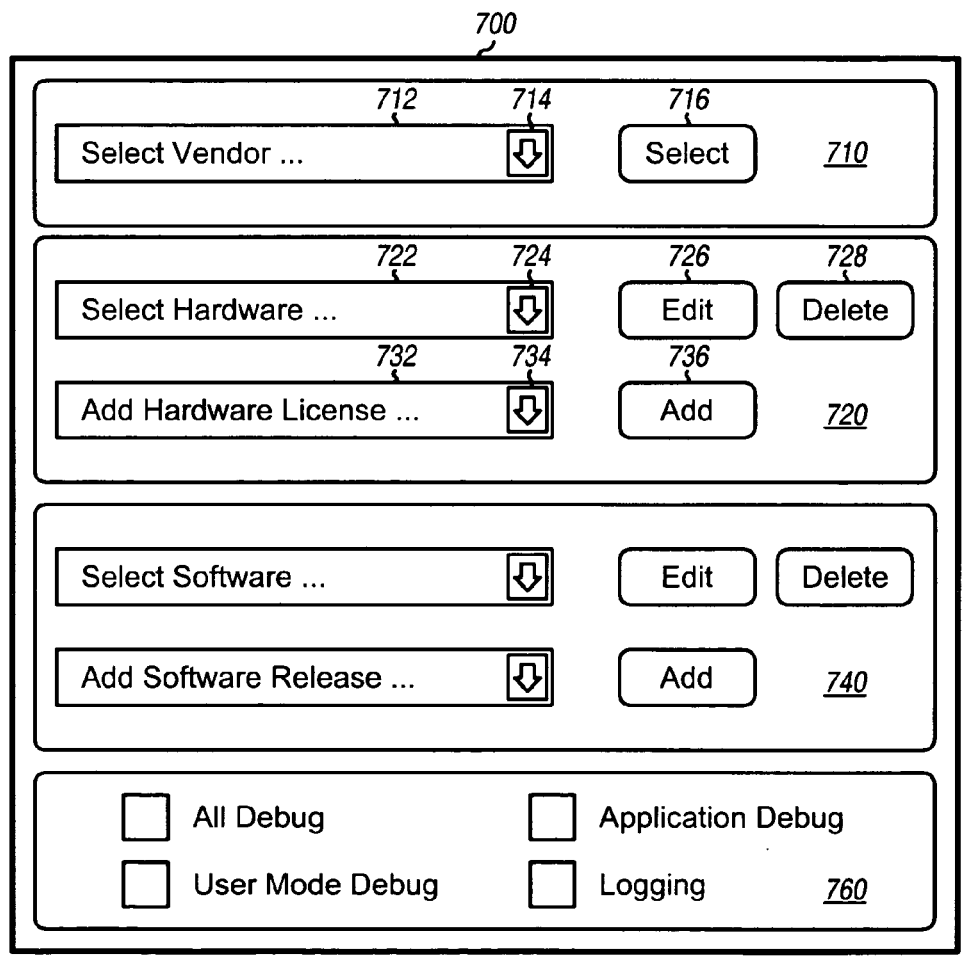
FIG. 7 shows a web page used to obtain signing privilege information.

FIG. 7 shows a web page 700 that may be displayed by Management System 210 to the MS administrator to obtain signing privilege information for a vendor. Web page 700 includes a section 710 to select a vendor, a section 720 to select hardware platforms for a selected vendor, a section 740 to select software releases for a selected hardware platform, and a section 760 to select debug capabilities for a selected software release.

On web page 700, the MS administrator may click on a button 714 to view a list of all registered vendors (not shown in FIG. 7) in a menu box 712. The MS administrator may then scroll down the list of vendors, select a vendor in the list, and click on a Select button 716. Management System 210 then pulls up all of the signing privileges currently stored for the selected vendor. The MS administrator may click on a button 724 to view a list of hardware platforms already authorized for the selected vendor in a box 722. The MS administrator may then scroll down the list, select a hardware platform, and click on an Edit button 726 to change the signing privileges for the selected hardware platform or a Delete button 728 to delete the hardware platform. The MS administrator may also add a new hardware platform for the selected vendor by clicking on a button 734, selecting a hardware platform displayed in a box 732, and clicking on an Add button 736. The MS administrator may select software releases for each selected hardware platform using the buttons and boxes in section 740, in a manner similar to that described above for selecting hardware platforms. The MS administrator may also select debug capabilities for each selected software release by checking the appropriate boxes in section 760.

Figure 8:
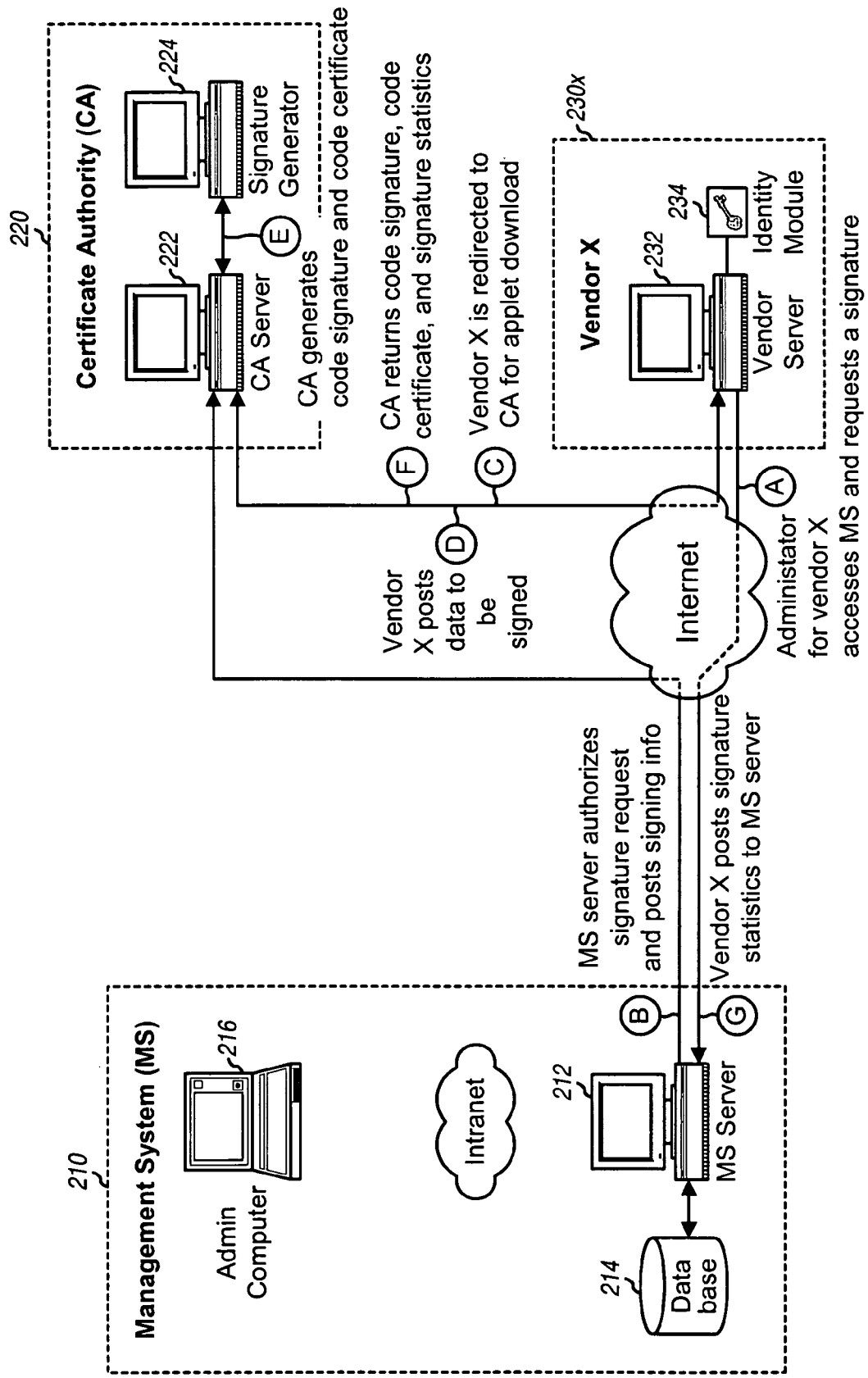
FIG. 8 shows the interaction between the vendor, the Management System, and the Certificate Authority to generate a signature.

FIG. 8 shows the interaction between vendor 230x, Management System 210, and Certificate Authority 220 to generate a signature. Vendor 230x may request a signature for a particular software release, a particular debug capability, and a particular hardware platform. Management System 210 authorizes the generation of the signature only if vendor 230x has the proper signing privileges. This prevents vendor 230x from loading and using software on an unlicensed hardware platform, using an unlicensed software release on a licensed hardware platform, using an unauthorized debug capability for a licensed software release, and so on.

Figure 9:
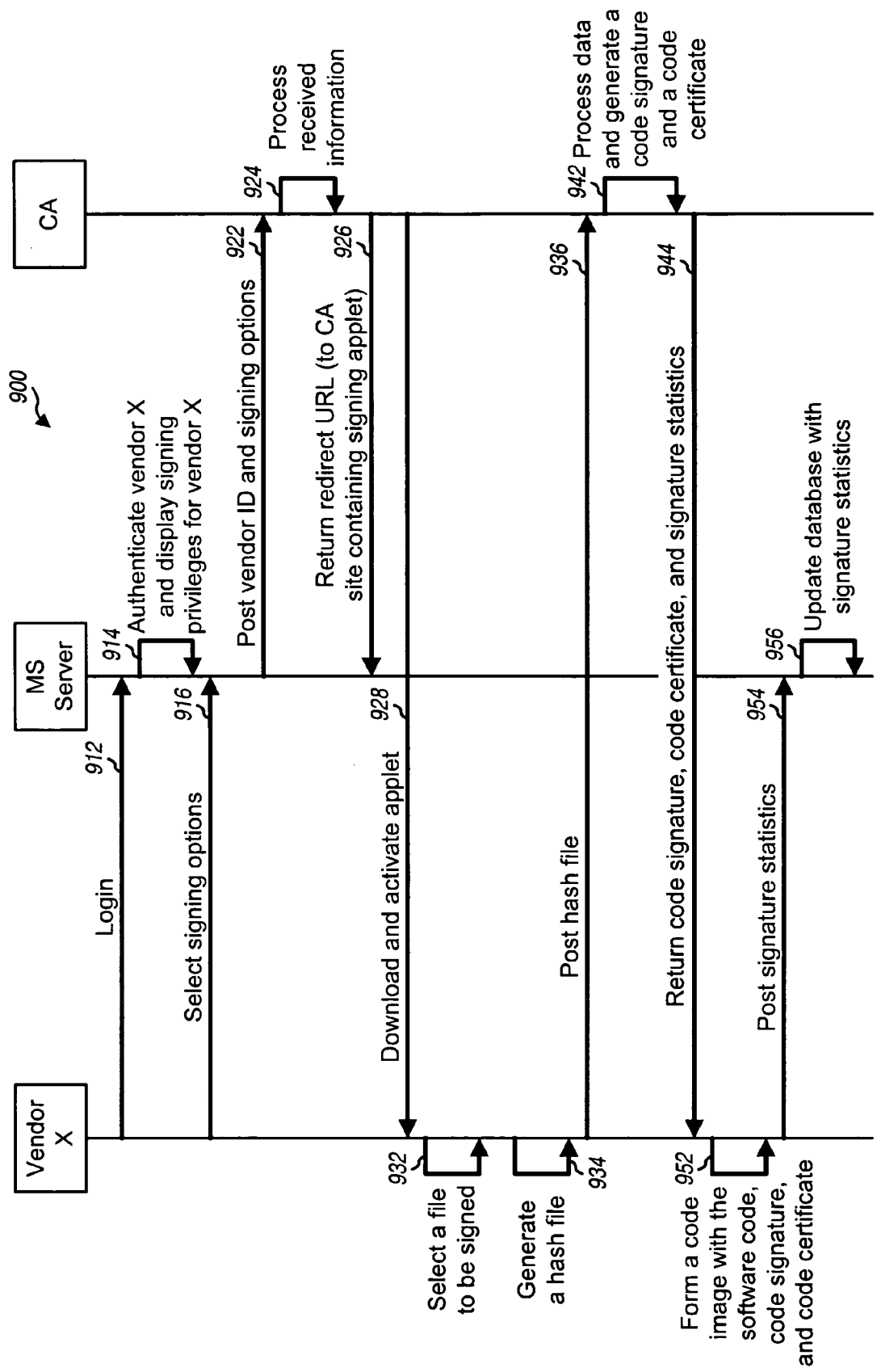
FIG. 9 shows a signature generation process.

FIG. 9 shows a signal flow diagram of a signature generation process 900. For clarity, the signature generation is described in conjunction with the diagram shown in FIG. 8.

An administrator for vendor 230x (or vendor administrator) accesses Management System 210 via a secure link to request a signature (step 912, which corresponds to step A in FIG. 8). Management System 210 authenticates the vendor identity, e.g., based on a vendor signature generated with the vendor private key and sent along with the request (step 914). If vendor 230x is authenticated, Management System 210 displays the signing privileges for the vendor (also in step 914). The vendor administrator selects the desired signing options from among the available options, which are determined by the signing privileges for vendor 230x (step 916). For example, the vendor administrator may select a specific hardware platform from among the authorized hardware platforms, a specific software release from among those authorized for the selected hardware platform, and the desired debug capability from among those authorized for the selected software release. Steps 912, 914, and 916 correspond to step B in FIG. 8.

Upon receiving the signing options submitted by the vendor administrator, Management System 210 initiates a signature transaction by posting the signing options and the vendor ID to Certificate Authority 220 over a secure link (step 922, which also corresponds to step B in FIG. 8). The posted signing options may include a hardware ID for the selected hardware platform, a software ID for the selected software release, and the selected debug capability. Management System 210 may also send an MS redirect URL that Certificate Authority 220 may use to post signature statistics at the completion of the signature transaction. Certificate Authority 220 processes the information received from Management System 210 (step 924). Certificate Authority 220 authenticates Management System 210 as well as the identity of vendor 230x and also parses the received information (e.g., the hardware and software IDs and the debug capability) in order to generate the signature.

After processing the information, Certificate Authority 220 returns a CA redirect URL to Management System 210 (step 926). This URL redirects the vendor administrator to the CA web site to download a signing applet onto vendor server 232 (step 928, which corresponds to step C in FIG. 8). This applet performs pre-processing for the signature generation at vendor 230x. The vendor administrator then selects a file containing the software release to be signed, e.g., via the applet (step 932). The applet generates a hash file (which is also called a "message digest") for the selected software file (step 934). Since the software file may be a large file with many mega-bytes of code, the hashing generates a short fixed-size hash file (e.g., with 160 bits) that may be more conveniently posted than the potentially large software file. The vendor administrator then submits the hash file, and the applet at vendor 230x posts the hash file to Certificate Authority 220 (step 936, which corresponds to step D in FIG. 8).

Certificate Authority 220 receives the hash file and generates a code signature over (1) the hash file received from vendor 230x and (2) the hardware ID and software ID received from Management System 210 (step 942, which corresponds to step E in FIG. 8). The signature is generated with a code private key. Certificate Authority 220 also generates a code certificate, which contains a CA signature, a code public key used to authenticate the code signature, and the selected debug capability received from Management System 210 (also in step 942). Certificate Authority 220 further generates a signed message containing statistics for the signature request just processed (also in step 942). Certificate Authority 220 then returns the code signature, code certificate, and signed message to vendor 230x (step 944, which corresponds to step F in FIG. 8).

Vendor 230x receives the code signature, the code certificate, and the signed message from Certificate Authority 220 and forms a code image that contains the software release, the code signature, and the code certificate (step 952). Vendor 230x may thereafter download the code image onto a wireless device. The applet at vendor 230x posts the signed message to Management System 210 (using the MS redirect URL sent by the Management System to the Certificate Authority in step 922) (step 954). Management System 210 validates the signed message, extracts the signature statistics from the message, and updates its database (step 956, which corresponds to step G in FIG. 8).

FIG. 9 shows the generation of a signature based on a request by a vendor administrator. In general, any administrator with a proper identity certificate and who is registered with the Management System may request a signature. For example, the MS administrator may request a signature.

Figures 10, 11:
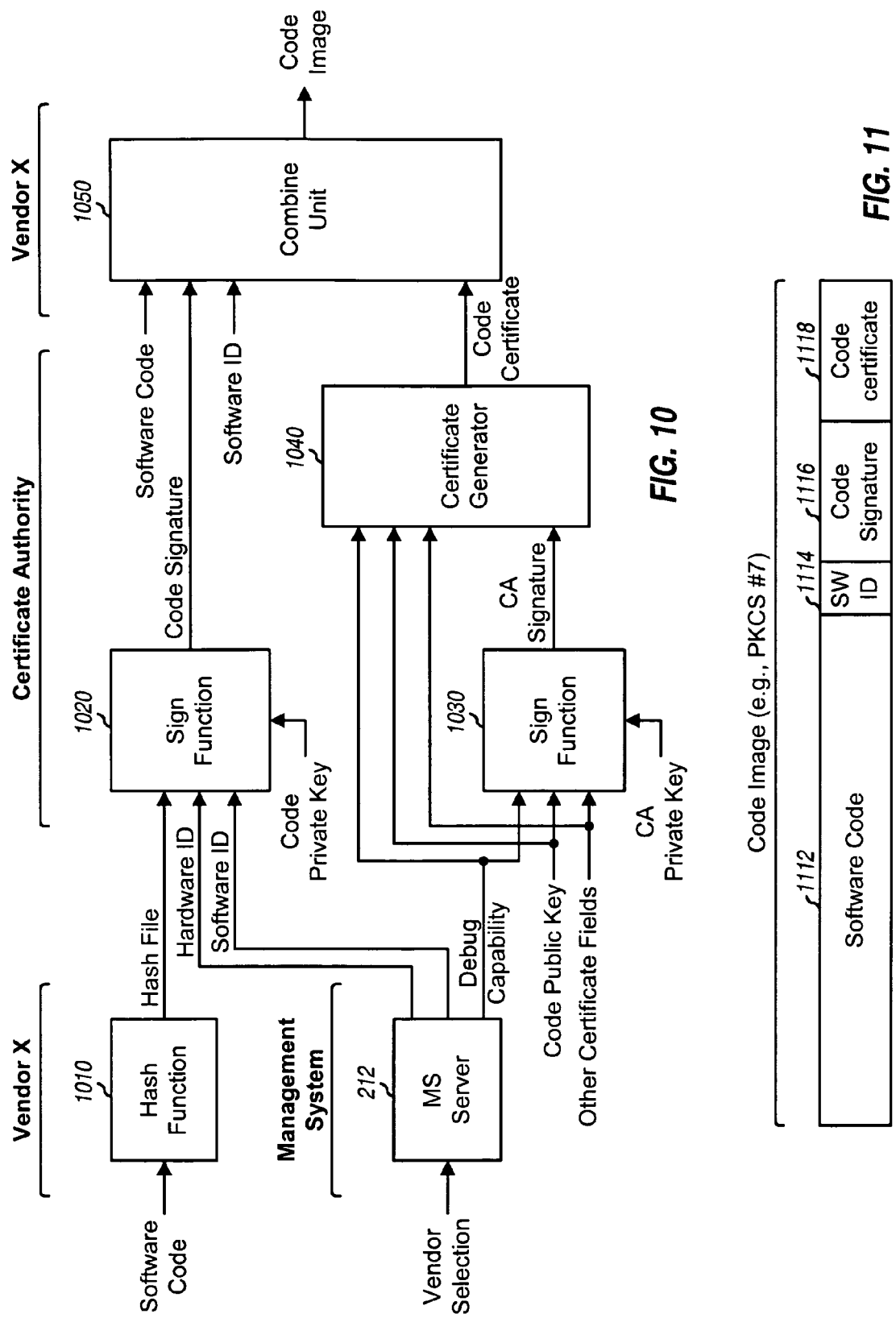
FIG. 10 shows the processing to generate a code signature and a code image.
FIG. 11 shows the code image generated by the vendor.

FIG. 10 shows the processing to generate the code signature, code certificate, and the code image. At vendor 230x, a hash function 1010 within the downloaded applet receives and hashes the file containing the software release to be signed and generates the hash file. Hash function 1010 maps the software file to the corresponding hash file. Hash function 1010 may be implemented with various cryptographic hash functions such as SHA-1 (Secure Hash Algorithm), which provides a 160-bit hash file, MD-5 (Message Digest), which provides a 128-bit hash file, or some other hash algorithm known in the art. Vendor 230x posts the hash file to Certificate Authority 220.

Certificate Authority 220 provides the cryptographic signing service using a minimum of two sets of keys: (1) a set of private and public keys used for signing and authenticating software code, which are referred to herein as the "code" private and public keys, and (2) a set of private and public keys used for identifying and authenticating Certificate Authority 220, which are referred to herein as the "CA" private and public keys. The CA private and public keys are typically permanent and change only if their secrecy is compromised. The code private and public keys may be generated each time a signature is requested and may thus be different from signature to signature.

At Certificate Authority 220, a sign function 1020 within signature generator 224 receives the hash file from vendor 230x, the software ID and hardware ID from MS server 212 at Management System 210, and the code private key. Sign function 1020 generates the code signature based on (and over) the hash file, the software ID, and the hardware ID using the code private key. Sign function 1020 may implement the RSA (Rivest, Shamir, and Adleman) algorithm, the Digital Signature Standard (DSS) algorithm, or some other cryptographic (digital signature or encryption) algorithm known in the art.

A sign function 1030 receives the debug capability for the software release being signed, the code public key, information for other fields of the code certificate, and the CA private key. The code public key is used by an end-user entity (e.g., a wireless device) to authenticate the code signature. The other code certificate fields may carry information identifying the entity generating the code certificate, the cryptographic algorithms selected for use, the expiration date of the code certificate, and so on. The code certificate has a lifetime that may be set, and the lifetime of the debug capability may be defined by setting the lifetime of the code certificate. Sign function 1030 generates a signature over the debug capability, the code public key, and the other code certificate fields using the CA private key. This signature is referred to herein as the "CA signature" and is used to authenticate the Certificate Authority. Sign function 1030 may implement the RSA, DSS, or some other cryptographic algorithm known in the art. A certificate generator 1040 then forms the code certificate with the debug capability, the code public key, the CA signature, and the other code certificate fields. The code certificate may be stored as an X.509 certificate or in some other format known in the art. Certificate Authority 220 sends the code signature and the code certificate to vendor 230x.

At vendor 230x, a combine unit 1050 within vendor server 232 receives and combines the software release, the software ID, the code signature, and the code certificate to form the code image. Vendor 230x may thereafter download the code image onto a wireless device.

FIG. 11 shows the code image generated by vendor 230x. The code image contains a field 1112 for the software code, a field 1114 for the software ID (SW ID), a field 1116 for the code signature generated by Certificate Authority 220, and a field 1118 for the code certificate provided by Certificate Authority 220. The code image may be stored in PKCS (Public-Key Cryptography Standards) #7 format or some other format known in the art. The code image may also contain additional and/or different information than that shown in FIG. 11.

Figure 12:
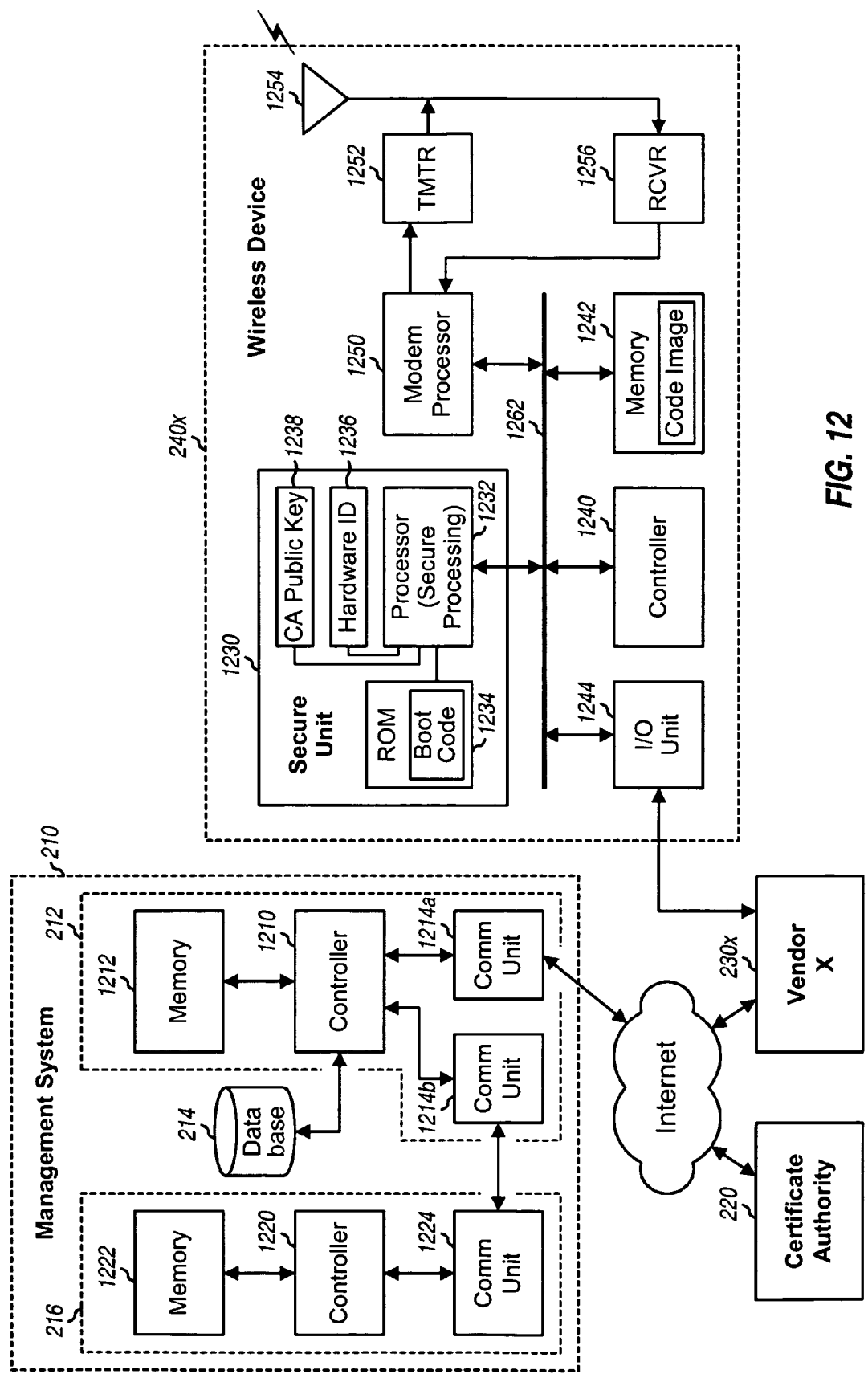
FIG. 12 shows a block diagram of the Management System, the Certificate Authority, the vendor, and a wireless device.

FIG. 12 shows a block diagram of Management System 210, Certificate Authority 220, vendor 230x, and a wireless device 240x. At Management System 210, MS server 212 includes a controller 1210, a memory unit 1212, and communication (comm) units 1214a and 1214b. Controller 1210 supports registration, renewal, and revocation of vendors, maintenance of signing privileges for the registered vendors, and generation of signatures upon request. Memory unit 1212 stores data and code used by controller 1210. Communication units 1214a and 1214b provide communication with external entities (e.g., via the Internet) and admin computer 216, respectively. Storage unit 214 stores the database of vendors and their signing privileges, statistics for signatures that have been generated, and so on. Admin computer 216 similarly includes a controller 1220, a memory unit 1222, and a communication unit 1224. Although not shown in FIG. 12, each of the servers at Certificate Authority 220 and vendor 230x may include a controller, a memory unit, and a communication unit.

Wireless device 240x may communicate with one or more wireless communication systems such as a Code Division Multiple Access (CDMA) system, a Global System for Mobile Communications (GSM) system, and so on. A CDMA system may implement one or more CDMA standards such as IS-2000, IS-856, IS-95, Wideband-CDMA (W-CDMA), and so on. Wireless device 240x is capable of providing bi-directional communication via a transmit path and a receive path.

For the transmit path, a modern processor 1250 processes (e.g., encodes and modulates) data to be transmitted by wireless device 240x and provides data chips to a transmitter unit (TMTR) 1252. Transmitter unit 1252 conditions (e.g., converts to analog, filters, amplifies, and frequency upconverts) the data chips and generates a modulated signal, which is transmitted via an antenna 1254. For the receive path, signals transmitted by base stations in one or more systems are received by antenna 1254 and provided to a receiver unit (RCVR) 1256. Receiver unit 1256 conditions (e.g., filters, amplifies, and frequency downconverts) the received signal, digitizes the conditioned signal, and provides data samples to modern processor 1250 for demodulation and decoding.

A controller 1240 performs various functions and coordinates and controls the operation of the processing units within wireless device 240x. A memory unit 1242 stores data and code (e.g., the code image) used by various units within wireless device 240x. An I/O unit 1244 provides an interface to external entities and may be used for downloading the code image to wireless device 240x. A bus 1262 interconnects various units within wireless device 240x.

A secure unit 1230 performs secure processing and provides secure storage for wireless device 240x. Secure unit 1230 includes a processor 1232 that performs secure processing and possibly other processing, a read only memory (ROM) 1234 that stores a boot code, a unit 1236 that stores the hardware ID for device 240x, and a unit 1238 that stores the public key for Certificate Authority 220. Units 1236 and 1238 may be implemented with ROMs, fuses, and so on. Secure unit 1230 is implemented as a secure and/or tamper resistant unit or module.

Processor 1232 executes the boot code and performs secure processing to validate the software code in the code image each time wireless device 240x is powered to ensure that the software code is authorized for execution. Processor 1232 performs the validation based on the boot code stored in ROM 1234 and using the hardware ID and CA public key embedded within secure unit 1230. This allows processor 1232 to establish trust within wireless device 240x from a known valid state, which is defined by the boot code, the hardware ID, and the CA public key. Processor 1232 authorizes execution of the software code only after the software has been validated.

To validate the software in the code image, the code certificate is obtained from the code image, and the CA signature in the code certificate is validated using the CA public key that is stored within secure unit 1230. Since the CA signature was generated using the CA private key, this CA signature can be validated using the corresponding CA public key that is stored in the wireless device. If the CA signature is validated, then the code signature in the code image is next validated. This is achieved by hashing the software code in the code image using the same hash function (used by the applet from Certificate Authority 220) to obtain a new hash file. The code signature is then validated based on the new hash file, the software ID from the code image, the hardware ID from secure unit 1230, and the code public key in the code certificate. Since the CA signature is generated over the code public key, this key is authenticated if the CA signature is authenticated by the CA public key. The signature verification is also performed using the complementary signature verification function of the cryptographic algorithm used to generate the code signature, as is known in the art.

For clarity, the techniques for managing signing privileges for a cryptographic signing service have been specifically described for a specific application, which is the enforcement of authorized use of specific software releases for specific hardware platforms. These techniques may also be used for other applications. For example, these techniques may be used to protect contents, which may be games, music, video, enterprise applications, and so on. The enterprise applications may be mobile commerce (e.g., protection of user or client-side credentials for accessing on-line statements, accounts, and so on). A vendor Y may be licensed to provide certain contents for certain electronics devices. The Management System registers vendor Y and stores the signing privileges for vendor Y with respect to all of the contents that may be signed by the vendor. Vendor Y requests for a signature whenever it wants to download certain contents onto an electronics device. The Management System validates vendor Y, authorizes the signature request if vendor Y is validated and has the proper signing privileges, and initiates the signature generation. Vendor Y receives the signature and certificate for the contents and downloads the contents along with the signature and certificate onto the device. The device thereafter validates the signature using information in the certificate (e.g., a public key corresponding to the private key used to generate the signature) and other secure information stored in the device (e.g., the device ID, a subscription ID, and so on). The device uses the contents only if the signature is validated.

The contents that may be signed include contents covered by various licensing and compliance entities such as 4C Entity (which is a consortium of four companies), Content Management License Administrator (CMLA), and so on.

For clarity, a specific embodiment of the Management System and Certificate Authority has been described above. For this embodiment, the Management System and the Certificate Authority are two separate entities, which can provide certain advantages. A separate Management System can provide ready access to, and ease of maintenance of, the database for vendors and their signing privileges. The services provided by the Certificate Authority (vetting of vendors, signature and certificate generation, key management, and so on) may be obtained from any one of a number of commercial entities currently available and capable of providing such services. The Management System and Certificate Authority may also be implemented as one integrated entity.

An on-line portal environment is also described above for the Management System, Certificate Authority, and vendors. This portal environment can provide various benefits such as easy accessibility and high availability. The Management System, Certificate Authority, and vendors may also communicate via other communication means, and this is within the scope of the invention.

The techniques described herein for managing signing privileges for a cryptographic signing service may be implemented by various means. For example, these techniques may be implemented in hardware, software, or a combination thereof. For a hardware implementation, the processing units used to manage the signing privileges may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 1212 in FIG. 12) and executed by a processor (e.g., controller 1210). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method operational on a third entity for managing signing privileges for a cryptographic signing service, comprising:

registering a first entity with a second entity via a communication network for the cryptographic signing service, wherein the first entity is a vendor server that manages software distribution to one or more wireless client terminals having different hardware platforms;

determining signing privileges for the first entity, the signing privileges indicating items for which cryptographic signatures may be obtained by the first entity, where each item is a specific combination of a software version and a hardware platform from among a plurality of possible combinations;

receiving a request for a cryptographic signature for a specific item over the communication network from the first entity; and authorizing or denying the request based on whether the previously determined signing privileges for the first entity indicate that a cryptographic signature can be obtained by the first entity for the specific item, wherein authorizing the request causes a first cryptographic signature and a first cryptographic certificate for the specific item to be subsequently issued and sent over the communication network to the first entity by the second entity, where the first cryptographic certificate is used to validate the first cryptographic signature by the one or more wireless client terminals to ascertain authorization for the specific item distributed by the first entity over a wireless network.

2. The method of claim 1, wherein the registering a first entity with a second entity includes:
   authenticating an administrator logging in with the third entity to register the first entity;
   receiving registration information for the first entity from the administrator;
   sending the registration information from the third entity to the second entity; and
   wherein the first entity is examined and approved by the second entity based in part on the registration information.

3. The method of claim 2, further comprising:
   receiving cryptographic information from the second entity and associating the cryptographic information with the first entity.

4. The method of claim 3, wherein the first entity is issued a private key by the second entity, and wherein the cryptographic information is a public key corresponding to the private key issued to the first entity.

5. The method of claim 1, further comprising:
   authenticating the first entity to verify its identity;
   authorizing the request from the first entity if the identity of the first entity is successfully authenticated; and
   denying the request from the first entity if authentication of the first entity identity fails, thereby preventing the first entity from receiving the first cryptographic signature.

6. The method of claim 5, wherein the first entity is issued and sent an identity certificate that is used to uniquely identify the first entity, and wherein the first entity is authenticated based on cryptographic information in the identity certificate.

7. The method of claim 1, further comprising:
   initiating a transaction from the third entity with the second entity to generate the first cryptographic signature if the request is authorized.

8. The method of claim 7, further comprising:
   providing information from the third entity to the second entity used to generate the first cryptographic signature.

9. The method of claim 8, wherein the information used to generate the first cryptographic signature includes a software identifier for software that the first entity can distribute and a hardware identifier for at least one of the one or more wireless client terminals with which the first entity communicates.

10. The method of claim 7, further comprising:
    receiving a message from the second entity with status information for the first cryptographic signature; and
    storing the status information.

11. The method of claim 1, wherein the signing privileges relate to hardware platforms of the one or more wireless client terminals for which the first entity is authorized to obtain cryptographic signatures, and wherein the request is for a cryptographic signature for a specific hardware platform.

12. The method of claim 1, wherein the signing privileges relate to software releases for which the first entity is authorized to obtain cryptographic signatures, and wherein the request is for a cryptographic signature for a specific software release that the first entity can distribute to at least one of the one or more wireless client terminals.

13. The method of claim 12, wherein the second entity is a certificate authority server, and the third entity is a management server.

14. The method of claim 1, wherein the signing privileges relate to specific software releases for specific hardware platforms for which the first entity is authorized to obtain cryptographic signatures, and wherein the request is for a cryptographic signature for a specific software release for a specific hardware platform.

15. The method of claim 1, wherein the signing privileges relate to contents suitable for download onto at least one of the one or more wireless client terminals for the first entity.

16. The method of claim 1, wherein the determining signing privileges for the first entity includes
    authenticating an administrator logging in to set signing privileges for the first entity,
    receiving from the administrator indications of signing privileges authorized for the first entity, and
    updating a database with the signing privileges authorized for the first entity.

17. The method of claim 1, further comprising: registering a plurality of entities for the cryptographic signing service, wherein the first entity is one of the plurality of entities; and determining signing privileges for each of the plurality of entities.

18. The method of claim 17, further comprising: maintaining a database for the plurality of entities registered for the cryptographic signing service and the signing privileges for the plurality of entities.

19. The method of claim 1, wherein the first cryptographic signature and the first cryptographic certificate is also bound to the specific item and the first entity.

20. A third entity apparatus to manage signing privileges for a cryptographic signing service, comprising:
    a controller operative to
       register a first entity with a second entity via a communication network for the cryptographic signing service, wherein the first entity is a vendor server that manages software distribution to one or more wireless client terminals having different hardware platforms,
       determine signing privileges for the first entity, the signing privileges indicating items for which cryptographic signatures may be obtained by the first entity, where each item is a specific combination of a software version and a hardware platform from among a plurality of possible combinations,
       receive a request for a cryptographic signature for a specific item over the communication network from the first entity, and
       authorize or deny the request based on whether the previously determined signing privileges for the first entity indicate that a cryptographic signature can be obtained by the first entity for the specific item, wherein authorizing the request causes a first cryptographic signature and a first cryptographic certificate for the specific item to be subsequently issued and sent via the communication network to the first entity by the second entity, where the first cryptographic certificate is used to validate the first cryptographic signature by the one or more wireless client terminals to ascertain authorization for the specific item distributed by the first entity over a wireless network; and a storage unit operative to store identity information for the first entity and the signing privileges for the first entity.

21. The apparatus of claim 20, wherein the controller is further operative to authenticate the first entity to verify its identity, and wherein the request from the first entity is processed only if the identity of the first entity is successfully authenticated.

22. The apparatus of claim 20, wherein if the request is authorized, the controller is further operative to: initiate a transaction with a second entity to generate the cryptographic signature; and provide information used to generate the cryptographic signature to the second entity.

23. A third entity apparatus to manage signing privileges for a cryptographic signing service, comprising:

means for registering a first entity with a second entity via a communication network-for the cryptographic signing service with a second entity, wherein the first entity is a vendor server that manages software distribution to one or more wireless client terminals having different hardware platforms;

means for determining signing privileges for the first entity, the signing privileges indicating items for which cryptographic signatures may be obtained by the first entity, where each item is a specific combination of a software version and a hardware platform from among a plurality of possible combinations;

means for receiving a request for a cryptographic signature for a specific item over the communication network from the first entity; and means for authorizing or denying the request based on whether the previously determined signing privileges for the first entity indicate that a cryptographic signature can be obtained by the first entity for the specific item, wherein authorizing the request causes a first cryptographic signature and a first cryptographic certificate for the specific item to be subsequently issued and sent over the communication network to the first entity by the second entity, where the first cryptographic certificate is used to validate the first cryptographic signature by the one or more wireless client terminals to ascertain authorization for the specific item distributed by the first entity over a wireless network.

24. The apparatus of claim 23, further comprising:

means for authenticating the first entity to verify its identity, and wherein the request from the first entity is authorized if the first entity is successfully authenticated and it is denied otherwise to prevent the first entity from receiving the first cryptographic signature.

25. The apparatus of claim 23, further comprising:

means for initiating a transaction with a second entity to generate the first cryptographic signature, if the request is authorized; and means for providing to the second entity information used to generate the first cryptographic signature.

26. A method operational on a first entity for obtaining cryptographic signatures from a second entity, comprising:

registering the first entity with a third entity via a communication network for a cryptographic signing service, wherein the first entity is a vendor server that manages software distribution over a wireless network to one or more wireless client terminals having different hardware platforms;

receiving an identity certificate via the communication network from the second entity and used to uniquely identify the first entity;

requesting a cryptographic signature for a specific item from the second entity, via the third entity over the communication network, where the specific item is unique to a combination of a software version and a hardware platform from among a plurality of possible combinations, wherein the requested cryptographic signature is authorized or denied by the third entity based on information stored by the third entity and associated with the first entity, the information indicating whether the first entity is authorized to obtain the requested cryptographic signature for the specific item; and receiving a first cryptographic signature and a first cryptographic certificate for the specific item, generated and issued after the request, over the communication network from the second entity if the request is authorized by the third entity; wherein the first cryptographic certificate and the first cryptographic signature provide the first entity access to the specific item which the first entity can distribute to its one or more wireless client terminals over a wireless network.

27. The method of claim 26, wherein if the cryptographic signature is authorized by the third entity, the method further comprises: receiving an applet from the second entity; and hashing a file to be signed with the applet to generate the data to be signed.

28. The method of claim 26, wherein the second entity is a certificate authority server, and the third entity is a management server.

29. The method of claim 27, wherein if the cryptographic signature is authorized by the third entity, the method further comprises: receiving from the second entity a certificate containing cryptographic information used to validate the cryptographic signature; and forming an image with the file, the cryptographic signature, and the certificate.

30. A first entity apparatus to obtain cryptographic signatures from a second entity, comprising:

means for registering the first entity with a third entity via a communication network-for a cryptographic signing service, wherein the first entity is a vendor server that manages software distribution over a wireless network to one or more wireless client terminals, having different hardware platforms, to which it distributes updates;

means for receiving an identity certificate via the communication network from the second entity and used to uniquely identify the first entity;

means for requesting a cryptographic signature for a specific item from the second entity, via the third entity over the communication network, where the specific item is unique to a combination of a software version and a hardware platform from among a plurality of possible combinations, wherein the requested cryptographic signature is authorized or denied by the third entity based on information stored by the third entity and associated with the first entity, the information indicating whether the first entity is authorized to obtain the requested cryptographic signature for the specific item; and means for receiving a first cryptographic signature and a first cryptographic certificate for the specific item, generated and issued after the request, over the communication network-from the second entity if the request is authorized by the third entity;

wherein the first cryptographic certificate and the first cryptographic signature provide the first entity access to the specific item which the first entity can distribute to its one or more wireless client terminals over a wireless network.

31. A method, operational on a second entity, for providing a cryptographic signing service, comprising:

examining and approving a first entity based on registration information received at the second entity from the first entity and a third entity via a communication network, wherein registration of the first entity for the cryptographic signing service is initiated by the third entity and wherein the first entity is a vendor server that manages software distribution to one or more wireless client terminals having different hardware platforms;

providing to the first entity, via the communication network, an identity certificate used to uniquely identify the first entity;

receiving from the third entity, via the communication network, an indication to generate a cryptographic signature for the first entity, wherein the cryptographic signature is authorized or denied by the third entity based on information stored by the third entity indicating whether the first entity is authorized to obtain the cryptographic signature;

receiving from the first entity, via the communication network, a request to access a specific item along with a first piece of data associated with the first entity, where the specific item is unique to a combination of a software version and a hardware platform from among a plurality of possible combinations;

receiving from the third entity, via the communication network, a second piece of data;

generating the first cryptographic signature for the specific item, after the request, based on the first and second pieces of data;

generating a first cryptographic certificate for the specific item after the request; and providing the first cryptographic signature and the first cryptographic certificate for the specific item to the first entity via the communication network, wherein the first cryptographic signature provides the first entity access to the specific item which the first entity can distribute to its one or more wireless client terminals over a wireless network.

32. The method of claim 31, further comprising: sending to the first entity an applet used to hash a file to be signed to obtain the first piece of data.

33. The method of claim 31, wherein the first piece of data relates to software code to be signed, and wherein the second piece of data includes a hardware identifier for a hardware platform and a software identifier for the software code.

34. A second entity apparatus to provide a cryptographic signing service, comprising:

means for examining and approving a first entity based on registration information received at the second entity from the first entity and a third entity via a communication network, wherein registration of the first entity for the cryptographic signing service is initiated by the third entity, and wherein the first entity is a vendor server that manages software distribution to one or more wireless client terminals to which it distributes updates having different hardware platforms;

means for providing to the first entity, via the communication network, an identity certificate used to uniquely identify the first entity;

means for receiving from the third entity, via the communication network, an indication to generate a cryptographic signature for the first entity, wherein the cryptographic signature is authorized or denied by the third entity based on information stored by the third entity indicating whether the first entity is authorized to obtain the cryptographic signature;

means for receiving from the first entity, via the communication network, a request to access a specific item along with a first piece of data associated with the first entity, where the specific item is unique to a combination of a software version and a hardware platform from among a plurality of possible combinations;

means for receiving from the third entity, via the communication network, a second piece of data;

means for generating the first cryptographic signature for the specific item, after the request, based on the first and second pieces of data;

means for generating a first cryptographic certificate for the specific item after the request; and means for providing the first cryptographic signature and the first cryptographic certificate for the specific item to the first entity via the communication network, wherein the first cryptographic signature provides the first entity access to the specific item which the first entity can distribute to its one or more wireless client terminals over a wireless network.

35. A non-transitory processor readable medium comprising one or more instructions operational on an third entity for managing signing privileges for a cryptographic signing service, which when executed by a processor, causes the processor to:

register a first entity with a second entity via a communication network for the cryptographic signing service, wherein the first entity is a vendor server that manages software distribution to one or more wireless client terminals having different hardware platforms;

determine signing privileges for the first entity, the signing privileges indicating items for which cryptographic signatures may be obtained by the first entity, where each item is a specific combination of a software version and a hardware platform from among a plurality of possible combinations;

receive a request for a cryptographic signature for a specific item from the first entity over the communication network; and authorize or deny the request based on whether the previously determined signing privileges for the first entity indicate that a cryptographic signature can be obtained by the first entity for the specific item, wherein authorizing the request causes a first cryptographic signature and a first cryptographic certificate for the specific item to be subsequently issued and sent over the communication network to the first entity by the second entity, where the first cryptographic certificate is used to validate the first cryptographic signature by the one or more wireless client terminals to ascertain authorization for the specific item distributed by the first entity over a wireless network.

36. A non-transitory processor readable medium comprising one or more instructions operational on a second entity for providing a cryptographic signing service, which when executed by a processor, causes the processor to:

examine and approving a first entity based on registration information received at the second entity from the first entity and a third entity via a communication network, wherein registration of the first entity for the cryptographic signing service is initiated by the third entity and wherein the first entity is a vendor server that manages software distribution to one or more wireless client terminals having different hardware platforms;

provide to the first entity, via the communication network, an identity certificate used to uniquely identify the first entity;

receive from the third entity, via the communication network, an indication to generate a cryptographic signature for the first entity, wherein the cryptographic signature is authorized or denied by the third entity based on information stored by the third entity indicating whether the first entity is authorized to obtain the cryptographic signature;

receive from the first entity, via the communication network, a request to access a specific item along with a first piece of data associated with the first entity, where the specific item is unique to a combination of a software version and a hardware platform from among a plurality of possible combinations;

receive from the third entity, via the communication network, a second piece of data;

generate, after the request, the first cryptographic signature for the specific item based on the first and second pieces of data;

generate, after the request, a first cryptographic certificate for the specific item; and provide the first cryptographic signature and the first cryptographic certificate for the specific item to the first entity via the communication network, wherein the first cryptographic signature provides the first entity access to the specific item which the first entity can distribute to its one or more wireless client terminals over a wireless network.

37. A non-transitory processor readable medium comprising one or more instructions operational on a first entity for obtaining cryptographic signatures from a second entity, which when executed by a processor, causes the processor to:

register the first entity with a third entity via a communication network for a cryptographic signing service, wherein the first entity is a vendor server that manages software distribution over a wireless network to one or more wireless client terminals having different hardware platforms;

receive an identity certificate via the communication network from the second entity and used to uniquely identify the first entity;

request a cryptographic signature for a specific item from the second entity, via the third entity over the communication network, where the specific item is unique to a combination of a software version and a hardware platform from among a plurality of possible combinations, wherein the requested cryptographic signature is authorized or denied by the third entity based on information stored by the third entity and associated with the first entity, the information indicating whether the first entity is authorized to obtain the requested cryptographic signature for the specific item; and receive a first cryptographic signature and a first cryptographic certificate for the specific item, generated and issued after the request, over the communication network from the second entity if the request is authorized by the third entity; wherein the first cryptographic certificate and the first cryptographic signature provide the first entity access to the which the first entity can distribute to its one or more wireless client terminals over a wireless network.

* * * * *